US008082505B2

(12) United States Patent
Meimer et al.

(10) Patent No.: US 8,082,505 B2
(45) Date of Patent: Dec. 20, 2011

(54) MULTIUSER LEARNING SYSTEM

(76) Inventors: Erwin Karl Meimer, San Diego, CA (US); Tim A. Becker, San Diego, CA (US)

( * ) Notice: Subject to any disclaimer, the term of this patent is extended or adjusted under 35 U.S.C. 154(b) by 1215 days.

(21) Appl. No.: 11/670,944

(22) Filed: Feb. 2, 2007

(65) Prior Publication Data

US 2007/0190512 A1 Aug. 16, 2007

Related U.S. Application Data

(60) Provisional application No. 60/765,414, filed on Feb. 2, 2006.

(51) Int. Cl.
*G06F 17/00* (2006.01)

(52) U.S. Cl. ........ 715/732; 715/764; 715/201; 715/730; 715/731

(58) Field of Classification Search .................. 715/732, 715/764, 731, 201; 706/59, 61
See application file for complete search history.

(56) References Cited

U.S. PATENT DOCUMENTS

| 5,302,132 | A | * | 4/1994 | Corder | 434/156 |
|---|---|---|---|---|---|
| 6,185,684 | B1 | * | 2/2001 | Pravetz et al. | 713/182 |
| 6,755,659 | B2 | * | 6/2004 | LoSasso et al. | 434/219 |
| 7,149,788 | B1 | * | 12/2006 | Gundla et al. | 709/218 |
| 2003/0076352 | A1 | * | 4/2003 | Uhlig et al. | 345/738 |
| 2003/0145023 | A1 | * | 7/2003 | Bennett et al. | 707/205 |
| 2005/0154992 | A1 | * | 7/2005 | Chen et al. | 715/770 |
| 2005/0181348 | A1 | * | 8/2005 | Carey et al. | 434/350 |
| 2007/0122790 | A1 | * | 5/2007 | Sperle et al. | 434/350 |
| 2007/0245305 | A1 | * | 10/2007 | Anderson | 717/110 |

OTHER PUBLICATIONS

Memorize-It 4.0 'Increase Your Knowledge Today', Side Eight Software, Published 2005, 1 page.*
Welcome to the Flashcard Exchange, ABC Teach, Published 2003, 1 page. Internet article.*

* cited by examiner

*Primary Examiner* — Stephen Hong
*Assistant Examiner* — Matthew Ludwig
(74) *Attorney, Agent, or Firm* — Knobbe Martens Olson & Bear LLP

(57) ABSTRACT

A computer-implemented knowledge acquisition system which enables user to easily create and share electronic study material is disclosed. The system includes a content creation module which can be configured to receive question data and answer data input by a first user and create a package content file using the input data. The content creation module includes a multimedia library from which images, video, and audio can be selected for inclusion in the package content file. The system also has a package distribution module which allows users to send the package content files to one or more users using a variety of transferring techniques.

8 Claims, 10 Drawing Sheets

300(a) – ELECTRONIC STUDY MATERIAL

302 – QUESTION TEXT

304 – ANSWER TEXT

*FIG. 3(a)*

300(b) – USER-GENERATED ELECTRONIC STUDY MATERIAL

302 – QUESTION TEXT

304 – ANSWER TEXT

306 – EXPLANATORY ANSWER COMMENT

308 – ALTERNATIVE ANSWERS

310 - GRAPHICS

312 - AUDIO

*FIG. 3(b)*

MULTIUSER LEARNING SYSTEM

CROSS-REFERENCE TO RELATED APPLICATIONS

This application claims the benefit, under 35 U.S.C. §119, of U.S. Provisional Patent Application No. 60/765,414, filed Feb. 2, 2006, the disclosure of which is hereby incorporated by reference in its entirety.

BACKGROUND OF THE INVENTION

1. Field of the Invention

This application relates to knowledge acquisition tools. More particularly, this application relates to computer-based systems and methods for enhancing knowledge acquisition among groups of persons sharing common learning goals.

2. Description of the Related Technologies

Existing knowledge acquisition systems generally rely on subject matter experts to create and maintain the study material used by those using the systems (such as students, for example). Once the study material has been created, it is typically distributed to students so that they can use it to learn the material. Although the study material created and distributed is typically useful for learning the subject matter at hand, these systems generally rely on subject matter experts to create and maintain the study material. As a result, it is generally difficult for the students to enhance and supplement the material to suit their individual learning needs.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

In one embodiment, a computer-implemented method of providing learning services is provided. The method includes receiving study material including question and answer data input into a computing device by a first user. The method further includes creating a package content file from the received study material and storing the package content file in a memory. After storing the package content file, it is sent to a second user for viewing and editing by the second user.

In another embodiment, a computer-implemented knowledge acquisition system is provided. The system includes a content creation module configured to receive question data and answer data input by a first student and create a package content file therefrom. The system further includes a package distribution module configured to send the package content file from a first student to a second student. The content creation module includes a graphics library from which images are selected for inclusion in the package content file. The selected images may be related to the question data.

BRIEF DESCRIPTION OF THE DRAWINGS

In this description, reference is made to the drawings wherein like parts are designated with like numerals throughout.

FIGS. 3(*a*) and 3(*b*) are block diagrams of the data components of electronic study material and enhanced electronic study material, respectively.

DETAILED DESCRIPTION OF CERTAIN INVENTIVE EMBODIMENTS

Various embodiments of the invention provide for knowledge acquisition systems and methods which provide users with the ability to easily share and distribute self-created or self-enhanced study material with other users. The study material may take the form of enhanced "electronic flashcards" which incorporate various components beyond the typical flashcard which includes a simply a question and an answer. By providing the ability to easily share the user-generated content, student groups tasked with creating study materials are able to divide the amount of time spent creating learning materials, and increase the amount of time spent actually using the created materials.

For example, if two students are required to learn the contents of a text book having chapters 1-10, the first student may create electronic flashcards for the odd-numbered chapters, and the second student may create electronic flashcards for the even-numbered chapters. Once the flashcards have been created, the students may share their work and begin the process of memorizing and learning the material. This way, each of the students spends less time creating electronic flashcards, and more time learning the material in the flashcards. In addition, by providing users the ability to enhance and supplement flashcards received from others, users can improve received flashcards by adding additional content to them, and then redistribute the improved flashcards among others in the group.

Figure 1:
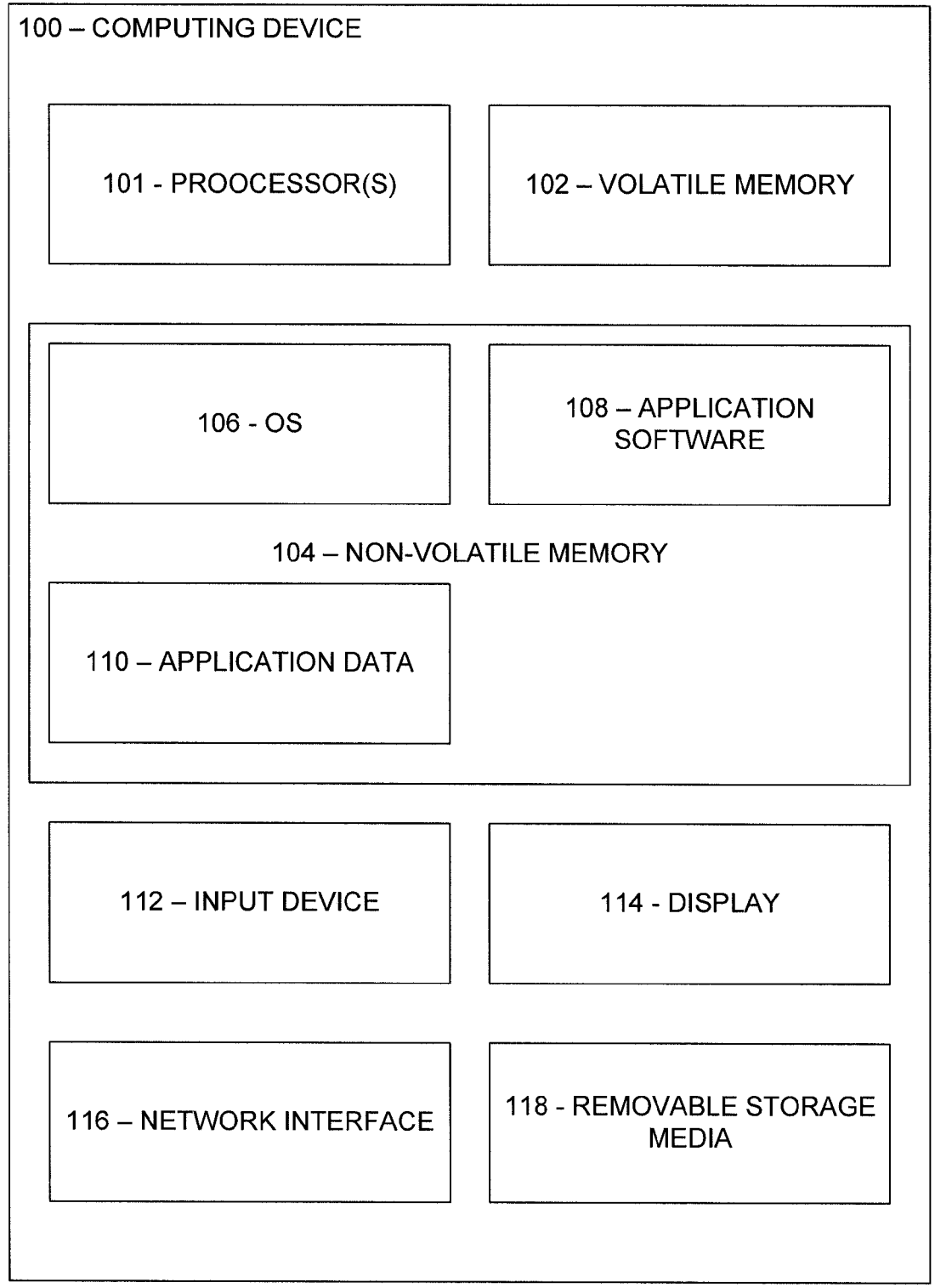
FIG. 1 is a block diagram showing a general purpose computer system suitable for implementing aspects of the present invention.

The systems and methods described herein are typically implemented on one or more computing devices in a computer network environment. With reference to FIG. 1, a block diagram of a computing device 100 suitable for practicing various aspects of the present invention is provided. The computer device 100 may take various forms. In one embodiment, the computing device 100 is a personal computer such as a desktop computer or a laptop computer. Alternatively, the computer device 100 may take the form of handheld computer such as a personal digital assistant (PDA) or a multi-use computing device such as a smart phone, or some other type of computer.

The computer device 100 typically includes many operating components, several of which are shown here. The computing device includes one or more processors 101. The processor may be a central processing unit which is configured to interpret computer program instructions and process data. Well known examples of central processing units are chips offered by Intel® and Advanced Micro Devices, Inc. which are typically installed in desktop computers. The computing device 100 may also include a volatile memory 102 such as random access memory (RAM). The computing device 100 may further include non-volatile memory 104. The non-volatile memory 104 may take various forms. The non-volatile memory 104 may include a hard disk drive or some other type of mass storage media. The non-volatile memory 104 may further include flash memory, or some form of read only memory (ROM) such as a PROM, EPROM, or EEPROM.

Stored on the non-volatile memory 104 may be an operating system 106. The operating system 106 may be a well known computer desktop operating system such as Windows®, MacOS®, or Linux. The operating system 106 may also take the form of a mobile operating system such as Symbian, Windows Mobile, Mobile Linux, PalmOS, or some other operating system 106 when the computing device 100 is a PDA or smart phone. Also stored on the non-volatile memory 104 may be application software 108. The application software 108 typically includes end user software applications such as web browsers, business applications and the like. In some embodiments, the systems and methods described herein are implemented as application software programs running within or on top of the operating system 106. In other embodiments, the knowledge acquisition systems described below may be implemented as a web-based application running within a web browser. Also included in the non-volatile memory may be application data 110. A portion of the application data 110 may be data that is related to the knowledge acquisition systems described in further detail below. In particular, the application data 110 may include "electronic flashcard" data, graphical data, audio data, or some other data.

The computing device 100 also includes one or more input devices 112 which are used to input data into the computing device by the user. The input devices 112 may include a keyboard, a mouse, a stylus, a touch screen, input a microphone, joystick, game pad, satellite dish, scanner, or the like. The computing device 100 also includes a display 114. The display 114 typically provides a graphical user interface with which a user may interact to control the operation of the computing device 100.

As certain embodiments may be implemented in a computer network environment, the computing device 100 may be equipped with a network interface 116. The network interface 116 may take the form of a network interface card (NIC) which may provide the computing device 100 with the ability to communicate with other computers on the network. The NIC may be a wireless network card, a wired network card, or both. The computing device 100 may further include a removable storage media 118. The removable storage media 118 may take the form of a memory stick, a writeable CD or DVD, a floppy disk, or some other storage media. The removable storage media 118 may be used to store application data 110 and to transfer application data between computing devices 100.

Figure 2:
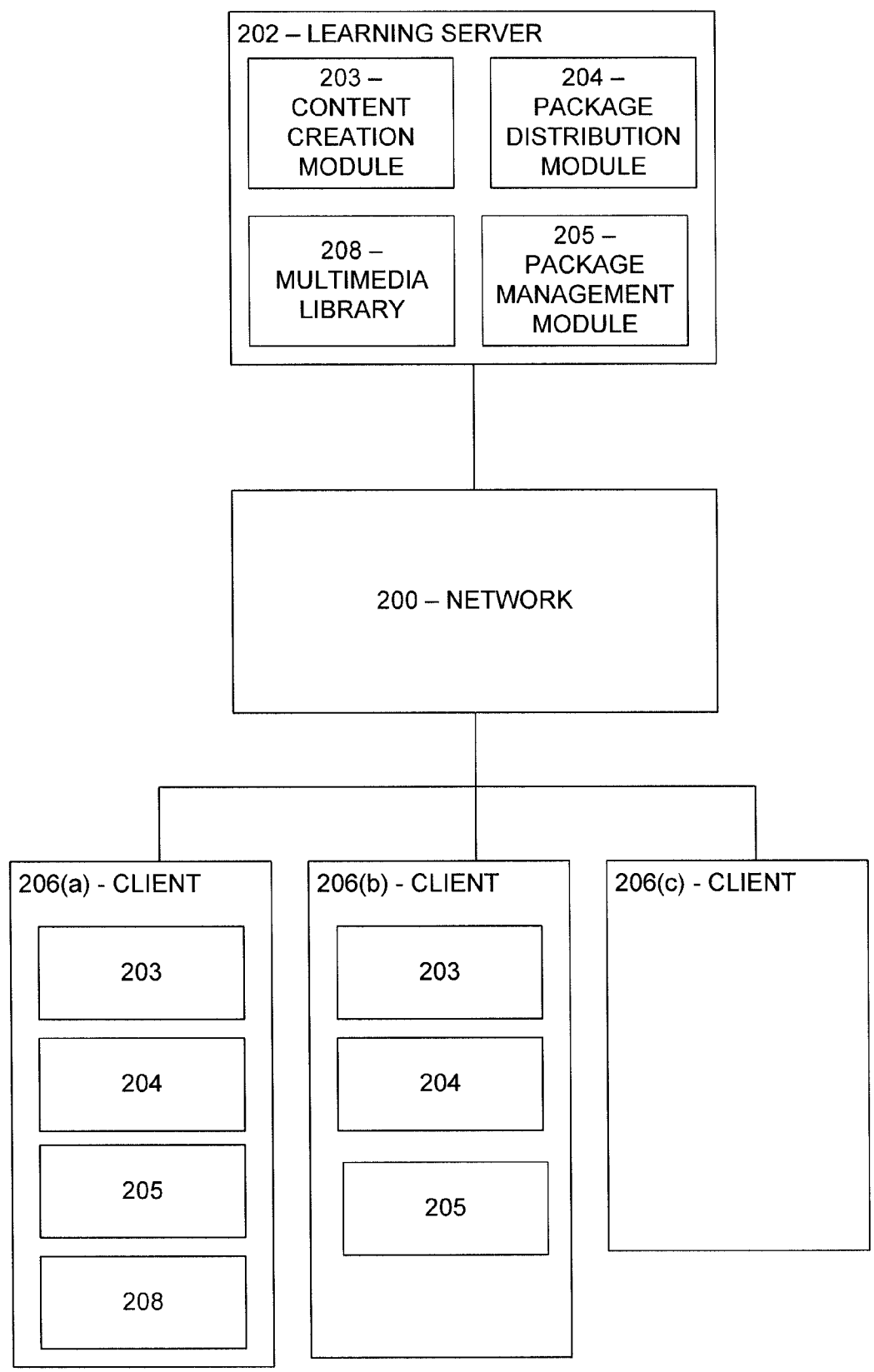
FIG. 2 is a block diagram of a computer network environment suitable for practicing one or more embodiments of the invention.

As noted above, various embodiments may be implemented within the context of a computer network environment. FIG. 2 is a block diagram providing an illustration of a suitable network environment for implementing various aspects of the invention. The network environment includes a network 200. In the embodiments described herein, the network 200 is a wide area network such as the Internet, for example. However, one of skill in the art will readily appreciate that the network 200 may be any of a number of different types of networks including a local area network, a wireless network, or some other type of network known in the art.

Connected to the network 200 is a learning server 202. In one embodiment, the learning server 202 is a web/application server which is configured to provide a platform from which a user can distribute and share knowledge acquisition content. The learning server 202 may include an application (or group of applications) running on one or more computing devices 100. In various embodiments described in further detail below, the learning server 202 is implemented as a web application service which utilizes a content creation module 203 and a package distribution module 204 to provide users with the ability to create, edit, supplement, and share knowledge acquisition content. The learning server 202 may be further equipped with a multimedia library 208. The multimedia library 208 typically stores graphics, audio and possibly video data which may be associated with enhanced and user-generated electronic flashcards, as will be discussed in additional detail below. Also included in the learning server 202 may be a package management module 205. The package management module 205 provides users with the ability to combine sets of electronic flashcards and other associated data into unified package content files for distribution via the package distribution module 204. The package management module 205 further allows users to import package content files into their existing electronic flashcards in a manner that will be discussed in further detail below.

Also connecting to the network 200 are one or more clients/users 206 (the terms clients and users are used interchangeably herein). As used herein, the terms "client" and "user" refer to any person who accesses the system for the purpose of viewing, modifying, and/or distributing user-generated study material. The users 206 connect to the learning server 202 using computing devices 100 via the network 200. In some embodiments, users 206 may have locally installed versions of the content creation module 203 and a package distribution module 204 as shown with users 206(a) and 206(b). Moreover, some embodiments may further provide for the installation of a multimedia library 208 on a local computing device 100. While a specific network configuration is shown in FIG. 2, a skilled artisan will recognize that there are numerous hardware and software configurations which may be used to implement the learning server 202 and its various modules, aspects of which are described in further detail with reference to FIGS. 3-10 below.

As noted above, electronic study material 300 may take the form of an electronic flashcard which presents questions to a user 206 without showing the user the answer. Only after the user 206 has provided an answer to the question will the card then "flip over" and reveal the correct answer. In existing systems, the study material is generated and maintained by the subject matter experts, e.g., teachers, professors, educators, education companies, etc. FIG. 3(a) provides an example of a typical standard flashcard 300(a) (also referred to herein as "electronic study material"). As shown in FIG. 3(a), the standard electronic flashcard 300(a) includes question text 302. The question text 302 includes a question related to subject matter which the user 206 wishes to learn or is assigned to learn. The standard electronic flashcard 300(a) further includes an answer text 304. The answer text 304 specifies the correct answer to the question 302. The standard electronic study material 300(a) is typically provided to users 206 to help them learn a subject.

Certain embodiments of the invention provide a user the ability to generate an enhanced or extended flashcard which includes data beyond simply a question and an answer. The users 206 may access a content creation module 203 to enhance and modify a standard flashcard 300(a) and create an enhanced flashcard which includes additional data and multimedia, resulting in a more effective learning tool. Alternatively, users 206 may use the content creation module 203 to create enhanced electronic flashcards independently of any preexisting flashcard. In addition, one user such as user 206(a), for example, may also modify or enhance another enhanced flashcard which was previously created by another user 206(b).

FIG. 3(b) provides an illustration of additional and enhanced data which may be included in an enhanced flashcard 300(b). As shown in the figure, the user-generated enhanced electronic study material 300(b) includes question text 302 and answer text 304 as described above. Unlike the standard flashcard 300(a), however, additional data may be provided. For example, the user-generated enhanced electronic study material 300(b) may include an explanatory answer comment 306 which provides a more detailed explanation of the reasoning behind the answer text 304. The user-generated enhanced electronic flashcard 300(b) may also include alternative answers 308. In some cases, questions may have more than one correct answer. For example, "Who is the Senator from California?" This question has two correct answers. The primary answer text 304 may specify "Dianne Feinstein." However, the alternative answer 308 may specify "Barbara Boxer."

Users 206 may also add graphics 310 to the enhanced study material 300(b). The graphics may be selected from the multimedia library 208. The graphics may take the form of electronic image files such as GIF, JPG, TIF, PNG, BMP or some other data format. In alternate embodiments, instead of placing images directly into the flashcard 300(b), hyperlinks may be instead provided that lead to a web page having the image. In some embodiments, the data format is a compressed format which allows for a greater number of enhanced electronic flashcards 300(b) to be stored on a storage medium with limited capacity, such as a diskette or memory disk, for example. Users 206 may further add audio content 312 which is related to the study material 300(b). In some embodiments, video data may also be added to the electronic flashcard. The video data may be stored in the multimedia library 208.

Figure 4:
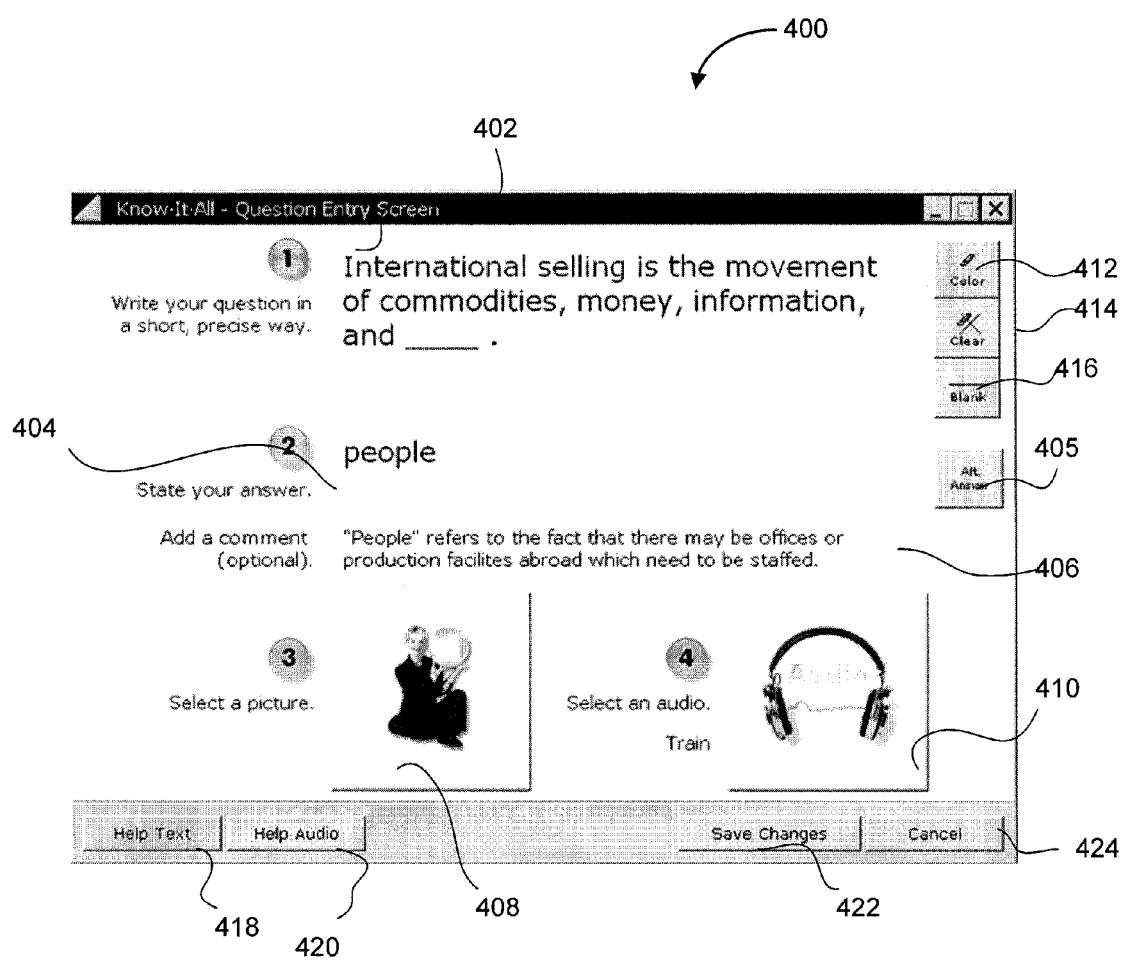
FIG. 4 is an example of a user interface for a content creation module.

FIG. 4 is an example of a user interface 400 which is configured to permit a user 206 to create and modify enhanced electronic flashcards 300(b). The user interface 400 includes a question data entry element 402 in which a user 206 enters or modifies question text 302 to be included in the enhanced electronic flashcard 300(b). The user interface 400 further includes an answer data entry element 404 which allows a user 206 to specify the answer text 304 for the enhanced flashcard 300(b). The question data entry element 402 and the answer data entry element 404 may be configured to be required data elements. Also included in the user interface 400 is an alternate answer selection element 405. The alternate answer selection element 405 may take the form of an interface button (as shown) which provides access to an additional answer data entry element 404 for specifying an alternate answer 308 to the question text 302.

The user interface 400 as shown in FIG. 4 further includes an explanation entry element 406. This user interface element provides the user 206 with the ability to provide a detailed explanation in the form of an explanatory answer comment 306 for the answer text 304 specified in the answer data entry element 404. The user interface 400 may further include graphics and audio selection buttons 408 and 410. These buttons allow the user 206 to select a graphics file 310 and/or audio file 312 to include in the electronic study material 300(b). The first button 408 provides access to the graphics portion of a multimedia library 208 located either on the learning server 202 or in a local multimedia library stored on the user's local computing device 100. The second button 410 provides access to the audio portion of a multimedia library 208 located either on the learning server 202 or in a locally installed multimedia library 208. Although the embodiment shown in FIG. 4 illustrates only graphics and audio selection, a skilled artisan will recognize that video selection may be implemented in a similar manner. Additional types of data may also be included in the flashcard 300(b). For example, a hyperlink to a website providing more information about the question topic may be included in the flashcard 300(b).

In order to allow the user to create more visually effective electronic flashcards 300(b), the user interface 400 may provide text editing buttons 412, 414, and 416. These buttons allow the user 206 to select and manipulate question entered data. The color button 412 allows the user to select a color for a selected block of text input into one of the data entry elements 404, 404, 405, and 406. Typically, if the flashcard 300(b) is created for the purpose of learning a definition of a term (such as "International selling" in the example provided), the term may be called out in a different color than the remainder of the question text 302. The clear button 414 provides the user 206 with one-click ability to clear an entire text entry field. The blank button 416 provides the user with the ability to insert a "fill in the blank" type question. In the example provide in FIG. 4, the question text 302 includes such a blank.

In some embodiments, the user interface 400 may also provide access to help screens which provide guidance to the user 206 on how to use the user interface 400. In the example provided, a help text button 418 provides access to a help screen which guides the user through the process of creating the text-based portions of the electronic flashcard 300(b). A help audio button 420 is also included to provide access to help in a sound format via a sound or audio file to guide the user 206 with navigating the user interface. Once the user has created the electronic flashcard 300(b), the user may save changes by selecting he save changes button 422. Depending on the implementation environment, selecting the save button 422 causes the electronic flashcard 300(b) to be saved either on the computing device 100 of the user 206, or on the learning server 202 (in a web or network-based implementation). A cancel button 424 is provided to allow the user to back out of any changes they have made to the content of an already existing electronic flashcard 300(b) without saving the changes.

Figure 5:
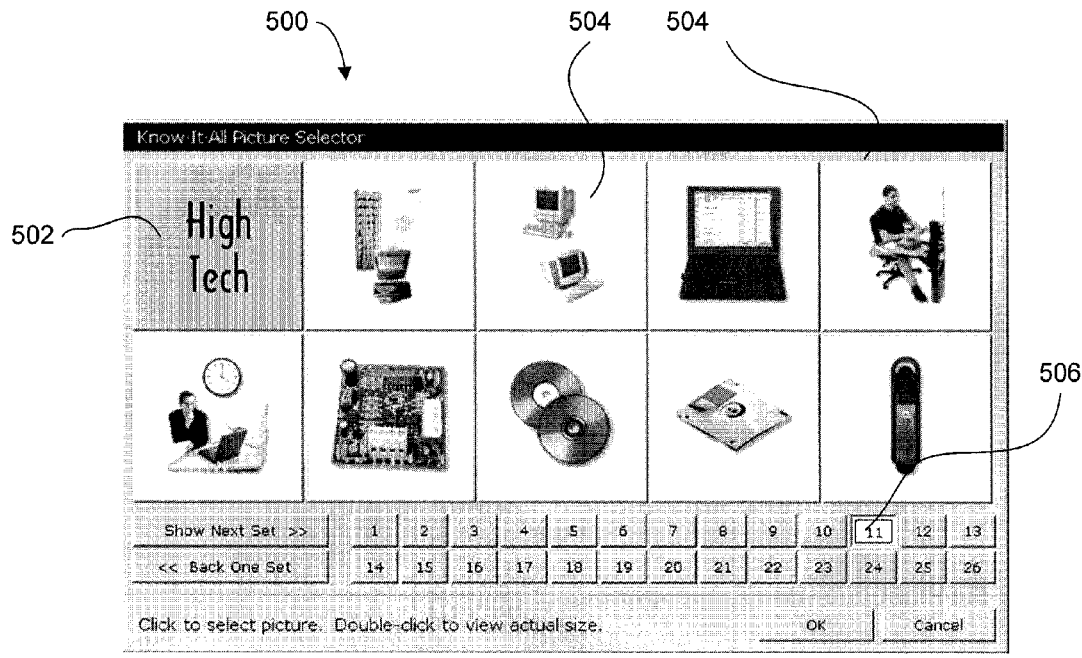
FIG. 5 is an example of a graphics selection portion of the content creation module from FIG. 4.

As noted above, the graphics selection button allows the user 206 to include a graphical element in the electronic flashcard 300. FIG. 5 provides an example of a user interface 500 for the graphics portion of a multimedia library 208. The graphics library may be broken down into various categories of images. The graphic selection interface 500 may specify the image category using an image block 502 as shown in the figure. The graphics selection interface 500 further includes a set of graphic images 504 from which the user 206 can make a selection. Because a limited number of images 504 can be displayed in the interface 500, the images 504 may be divided into sets which can be accessed by selecting the appropriate set button 506. When the user 206 has found the image they want, the may select the image and click the "OK" button to insert the image into the electronic flashcard 300(b).

Figure 6:
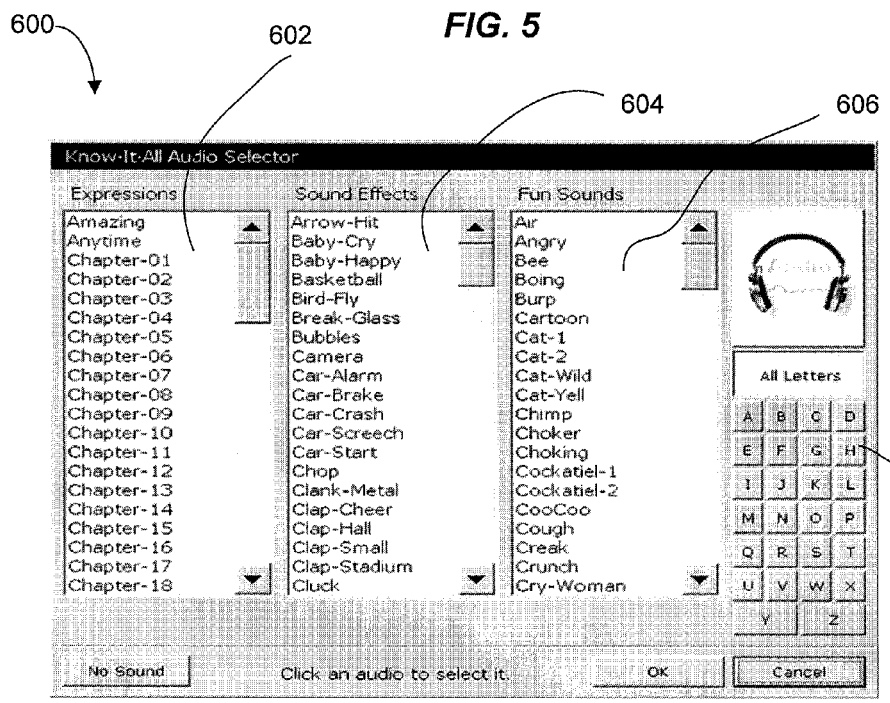
FIG. 6 is an example of an audio selection portion of the content creation module from FIG. 4.

Referring now to FIG. 6, an example of an audio selection user interface 600 is provided. As with the graphics user interface 500, the audio selection interface 600 allows the user to include a multimedia file (in the form of audio data 312) in the electronic flashcard 300(b). The audio data 312 may take various forms. They may be MP3 files, WAV files, MIDI files, AAC files, or some other audio file format. Various different categories of sound may be included in an electronic flashcard 300(b). In the example provided, three selection areas 602, 604, and 606 are provided which include different categories of audio. The first selection area 602 includes audio related to expressions. These audio files may be short sound bytes of a human or computer-generated voice which verbalize an expression. In the example provide in the figure, the expression include chapter numbers. Thus, if the user 206 selects "Chapter_01", an audio file which has a voice saying the expression "Chapter 1" is inserted into the flashcard 300(b) and is played when the flashcard is accessed in a learning mode (as will be discussed in additional detail below).

The audio data 312 may be further categorized and displayed in the sound effect selection area 604. The sound effect audio data 312 is typically an audio file of a sound effect which may be inserted into the electronic flashcard 300(b). The audio user interface 600 may further include a fun sound selection area 606 which provides access to sounds which are more whimsical in nature. The user 206 may sample any of the sounds prior to inserting it into the electronic flashcard by double clicking the sound. In addition, because the multimedia library may include large numbers of audio files, a filtering mechanism 608 may be provided which allows the user 206 to limit the number of audio files displayed at a time. In the example shown, the user has selected the letter "C", which filters the displayed audio data 312 down to those files beginning with the letter "C".

Figure 7:
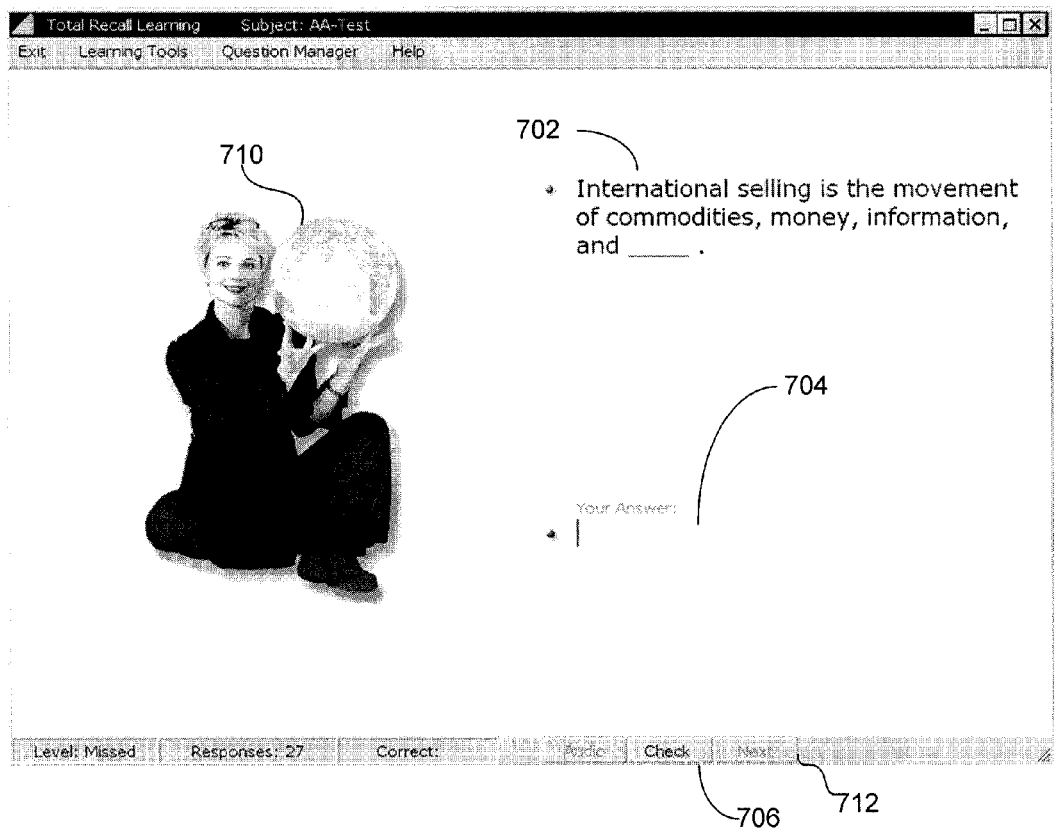
FIG. 7 is example of an electronic flashcard generated by the content creation module from FIG. 4.

Once the user 206 has created an enhanced electronic flashcard 300(b) using the interfaces described above, the electronic flashcard 300(b) may then be accessed in the learning mode (as opposed to the editing mode described in detail above). FIG. 7 provides an example of an electronic flashcard 300(b) which can be distributed to and shared among various users 206. As shown in the figure, the electronic flashcard 300(b) includes a question area 702 which displays the question text 302 for the electronic flashcard 300(b), an answer area 704 in which the user 206 can input his answer, and an image/video display area 710 in which graphic data 310 is displayed. The user 206 may read the question displayed, and then input an answer choice into the answer area 704. Once the user 206 inputs the answer, the user may then check the answer by selecting the check button 706. The answer data 304 associated with the flashcard is compared to the answer input by the user, and the correct answer is then displayed to the user (much as a traditional flashcard would be flipped to reveal the correct answer) along with any alternative answers 308, or explanatory answer comments 306 associated with the electronic flashcard 300(b). The system may store the responses and track the student's success rate in answering questions correctly. Once the user has revealed the correct answer, the "Next" button 712 (which is shown as inactive in this example) is activated and the user 206 may select it to proceed to another electronic flashcard.

Figure 8:
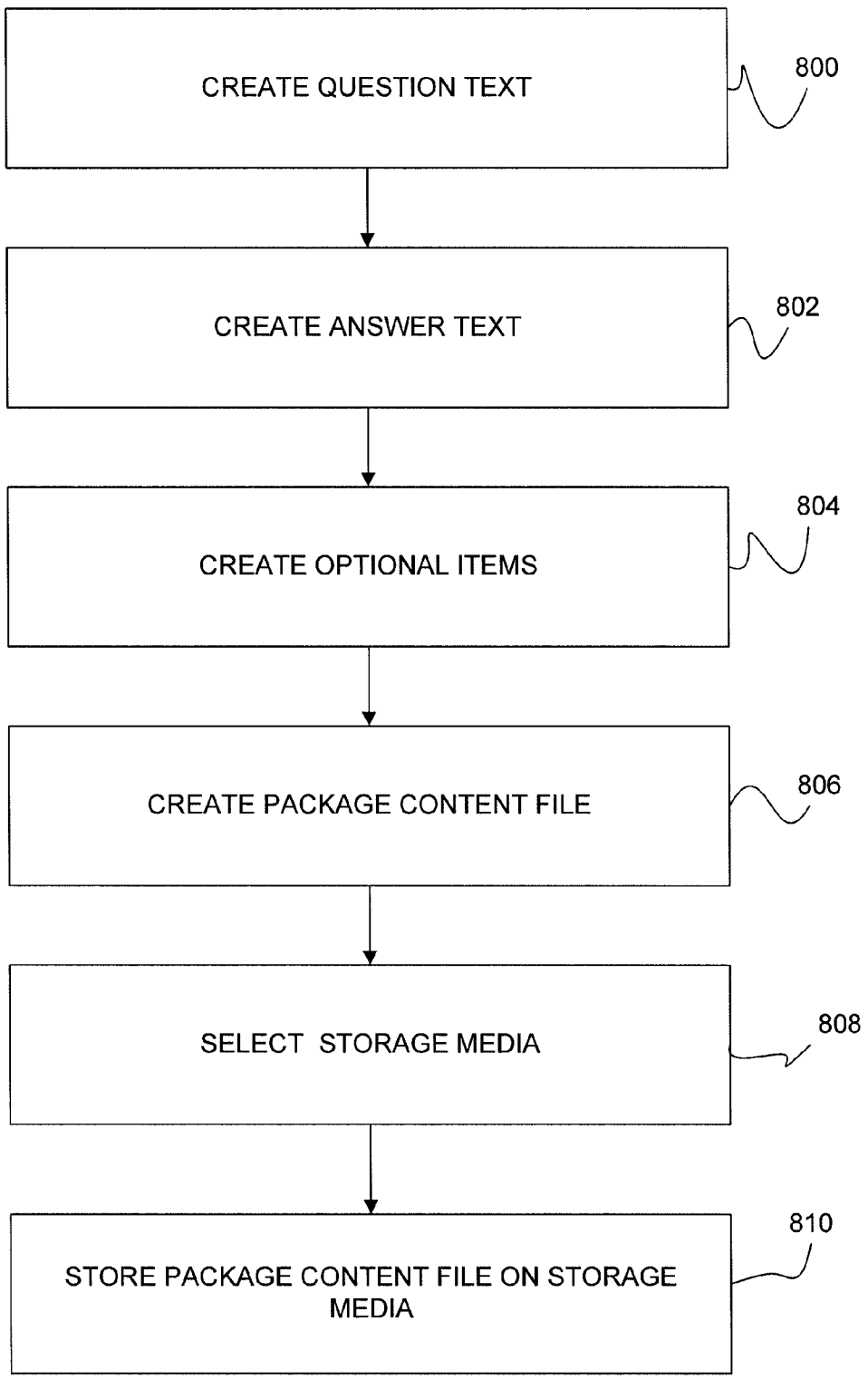
FIG. 8 is a flowchart illustrating of process of creating user-generated study material using the content creation module of FIG. 4.

As discussed previously, certain embodiments of the invention provide a user with the ability to generate enhanced electronic flashcards. Referring now to FIG. 8, a flowchart is provided which illustrates a process by which a user 206 may generate an enhanced electronic flashcard 300(b) via the user interface 400 described above. The process begins at block 800 with the user creating the question text 302 and entering it into the question data entry element 402. Next, the process moves to block 802, where the user 206 then creates the answer text 304 and enters it into the answer data entry element 402 of the user interface 400. At block 804, the user 206 then creates optional items such as explanatory answer comments 306, alternative answers 308, graphics 310, and audio 312. Once the study material 300(b) has been created, a package content file which compiles the created study material into a single file may then be generated by the package management module 205 (located either on the user computing device or learning server 202) at block 806. In some embodiments, the user may selectively choose slides 300 to include in the package content file. This process typically occurs when the user 206 selects the save changes button 422 of the user interface 400 which causes the system to either save a new flashcard 300(b) as a new record, or modify an existing flashcard 300 as an existing record. Next, the process moves to block 808, where the user selects the storage media for the generated package content file. As discussed above, the storage media may be any of various forms. In a web-based implementation, the storage media may be the learning server 202 itself. In a local implementation, the storage medium may be removable storage media 118, or non-volatile memory 104 of the user's computing device 100. Once the target storage media has been selected by the user (or alternatively automatically selected by the program), the process then moves to block 810, where the generated package content file is stored on the selected media.

Figure 9:
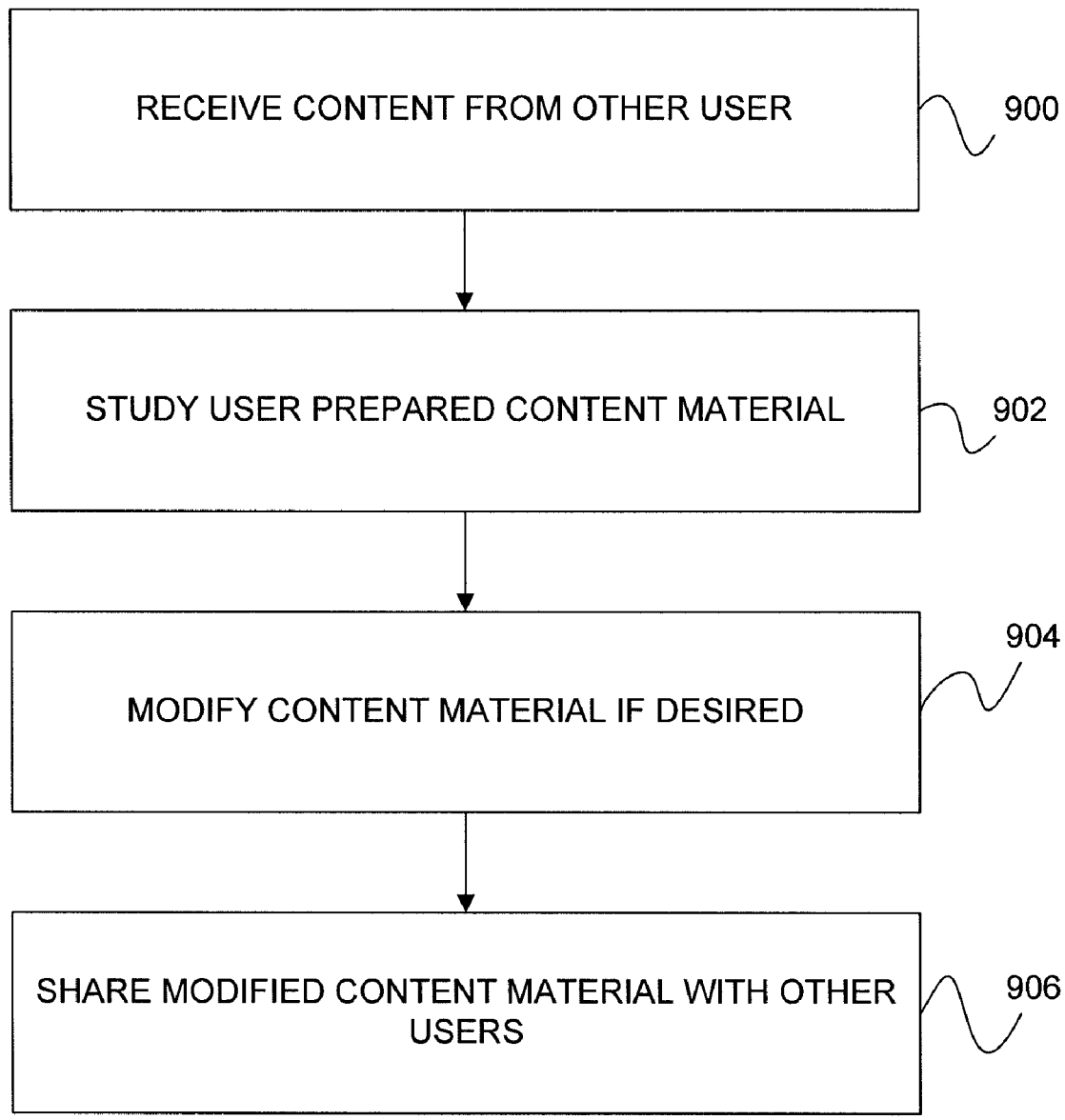
FIG. 9 is a flowchart illustrating a process of enhancing user-generated study material received from another student.

Referring now to FIG. 9, a flowchart illustrating a process by which two users, such as users 206(a) and 206(b) for example, can share user-generated study materials is provided. The process starts at block 900, where the first user 206(a) receives an electronic flashcard 300 from a second user 206(b) (in the form of a package content file) and imports it into his computing device 100 using the package management module 205. The package content file may be transferred among users in various ways. For example, the second user 206(b) may e-mail the package content file as an attachment to the first user 206(a). Alternately, the second user 206(b) may copy the package content file to a portable storage medium such as a floppy disk or USB flash memory stick, and simply give the physical storage media to the first user 206(a). In other embodiments, such as a web-based implementation for example, the second user may upload the package content file to the learning server 202 where the second user can download it from a webpage and import it using the package management module 205. Numerous other methods of transfer are possible.

The flashcard may be a standard flashcard 300(a), or an enhanced flashcard 300(b). The first user 206(a) then accesses the flashcard (as shown in FIG. 7) to study the content material at block 902. Once the first user 206(a) has studied the material, the process moves to block 904, where the first user 206(a) opens the received flashcard in the content creation module 203, and modifies the content if desired. Once the user 206(a) has finished his modifications, the process moves to block 906, where the first user 206(a) sends the modified flashcard 300(b) back to the second user 206(b), as well as other users such as a third user 206(c), if desired.

Figure 10:
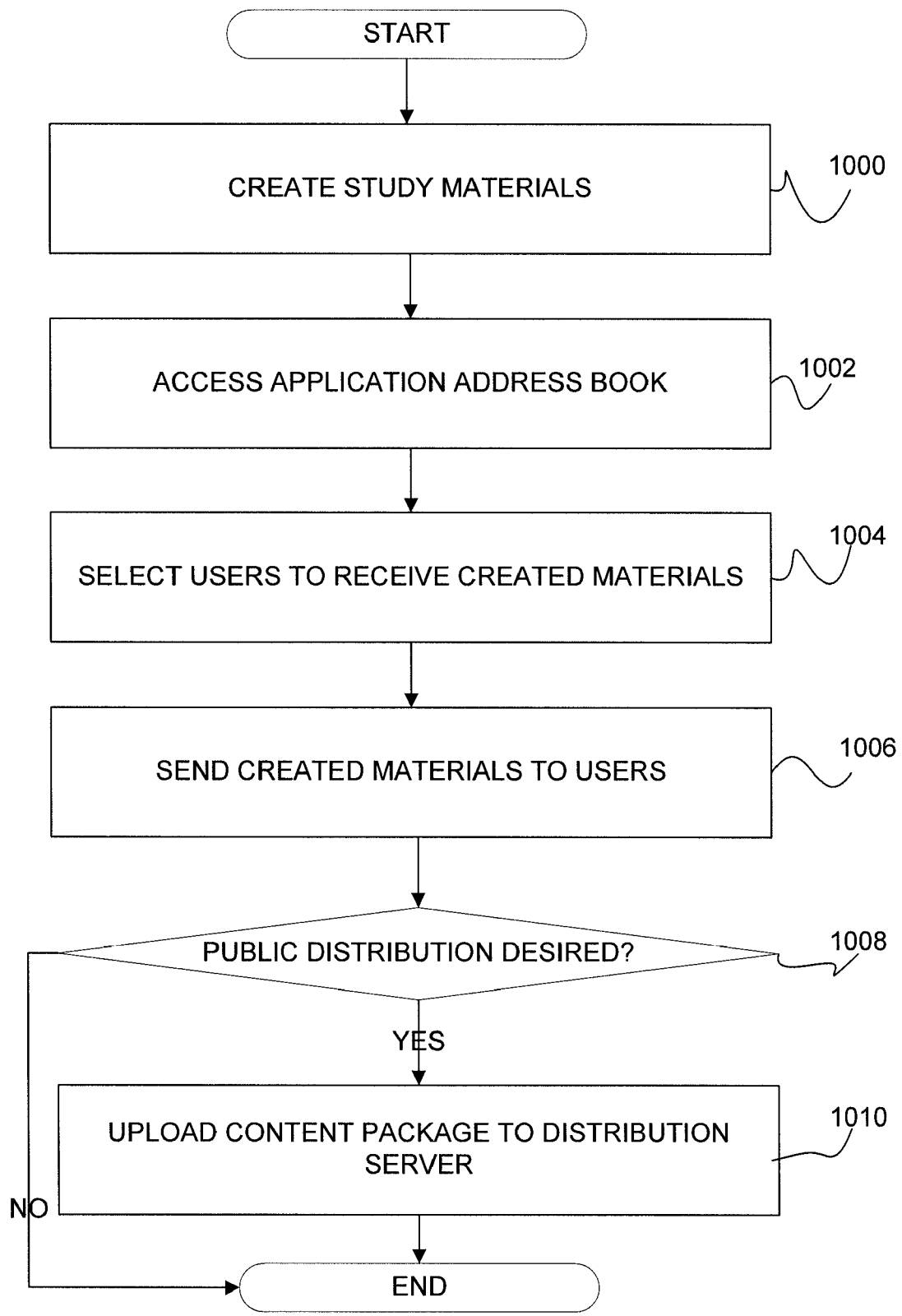
FIG. 10 is a flowchart illustrating a process of sharing user-generated study material.

According to certain embodiments, users 206 can create electronic flashcards 300 and share them with different groups of other users 206. For example, a user may wish to share his electronic flashcards with one or more students that are in the same course as the user. However, it may be that the user believes that that his electronic flashcards 300(b) may be useful to other persons not enrolled in the same course. As a result, the user 206 would like to make the electronic flashcards available to a broader audience. FIG. 10 illustrates a process by which a user 206 is able to share enhanced electronic content 300(b) with both a selected group of individuals and at the same time make the material available to a larger audience.

The process begins at block 1000, where a first user 206(*a*) creates study materials 300 possibly by using the systems described above with reference to FIGS. 4-7. Once the study materials 300 have been created, the process moves to decision block 1002, where the system determines whether the user wishes to share the created materials with a specific group of other users. If not, the process skips to block 1008 (which is discussed below). If the user 206(*a*) does wish to share the study materials 300 with other users, the process moves to block 1004, where the user provides a selection of other users 206(*b*) and 206(*c*), for example, to receive the study materials. After selecting the users 206(*b*) and 206(*c*) to receive the study material 300, the process moves to block 1006, where the materials are sent to the users. Next, at decision step 1008, the user 206(*a*) provides an indication of whether a public distribution of the generated content 300 is desired. If a public distribution of the content is desired, the process moves to block 1010, where the package content file is uploaded to a public distribution server such as learning server 202. If public distribution is not sought by the user 206(*a*), then the process terminates.

It will be understood by those of skill in the art that numerous and various modifications can be made without departing from the spirit of the present invention. Therefore, it should be clearly understood that the forms of the invention are illustrative only and are not intended to limit the scope of the invention.

What is claimed is:

1. A computer-implemented knowledge acquisition system comprising:
    a processor configured to execute computer instructions stored in a memory on the system, the computer instructions including:
        a content creation module configured to receive question data and answer data input by a first student and create one or more electronic slides therefrom;
        a package management module configured to compile a package content file based on a user selection of electronic slides to include in the package content file;
        a package distribution module configured to send the package content file from a first student to a second student;
        a user interface module configured to create a user interface having a first area, a second area, a third area, a fourth area, and a fifth area:
            the first area including a question data entry element configured to receive question data input by the first student;
            the second area including an answer data entry element configured to receive answer data input by the first student;
            the third area including an alternate answer data entry element configured to receive an alternate answer data input by the first student;
            the fourth area including an image selection button configured to provide access to a library of images, the library of images being displayed in a graphics selection interface of a multimedia library; and
            the fifth area including a sound selection button configured to provide access to a library of sound files, the library of sound files being displayed in a audio selection interface of the multimedia library;
    wherein the content creation module accesses a graphics library from which images are selected for inclusion in the package content file; the images being related to the question data, and
    wherein the content creation module further accesses an audio library from which audio samples are selected for inclusion in the package content file, the audio samples being related to the question data, and
    wherein the package distribution module is further configured to store the package content file in a network location for download by a third student, and
    wherein the electronic slides in the package content file are modifiable by the third student, and
    wherein the content creation module is further configured to provide audio instructions via an audio playing module to the first student, the audio instructions configured to guide the first student in creating the one or more electronic slides.

2. The computer-implemented knowledge acquisition system of claim 1, wherein the package distribution module is configured to store the package content file on a removable storage medium.

3. The computer-implemented knowledge acquisition system of claim 2, wherein the package content file is modifiable by the third student.

4. The computer-implemented knowledge acquisition system of claim 1, wherein the content creation module is further configured to receive explanatory answer comment data.

5. The computer-implemented knowledge acquisition system of claim 4, wherein the content creation module is further configured to receive alternative answer data.

6. The computer-implemented knowledge acquisition system of claim 1, wherein the audio library is displayed in a selection interface which categorizes the sound files into a plurality of selection areas.

7. The computer-implemented knowledge acquisition system of claim 6, wherein the plurality of selection areas comprise a selection area for selecting audio related to verbal expressions and audio related to sound effects.

8. The computer-implemented knowledge acquisition system of claim 7, wherein the audio selection interface of the multimedia library further comprises a filtering interface comprising a plurality of buttons associated with filtering criteria.

\* \* \* \* \*